United States Patent
Wang

(10) Patent No.: US 10,461,815 B2
(45) Date of Patent: Oct. 29, 2019

(54) MULTI-INPUT AND MULTI-OUTPUT SATELLITE SERVICE TERMINAL

(71) Applicant: PACIFIC TELECOM & NAVIGATION LIMITED, Wanchai, Hong Kong (CN)

(72) Inventor: Hao Wang, Hong Kong (CN)

(73) Assignee: PACIFIC TELECOM & NAVIGATION LIMITED, Wanchai, Hong Kong (CN)

( * ) Notice: Subject to any disclaimer, the term of this patent is extended or adjusted under 35 U.S.C. 154(b) by 0 days.

(21) Appl. No.: 16/003,316

(22) Filed: Jun. 8, 2018

(65) Prior Publication Data

US 2018/0294846 A1   Oct. 11, 2018

Related U.S. Application Data

(63) Continuation of application No. PCT/CN2015/097719, filed on Dec. 17, 2015.

(30) Foreign Application Priority Data

Dec. 11, 2015  (CN) .......................... 2015 1 0920831

(51) Int. Cl.
- *H04B 7/04* (2017.01)
- *H04B 7/0413* (2017.01)
- *H04B 7/185* (2006.01)
- *H04L 12/66* (2006.01)

(52) U.S. Cl.
CPC ........... *H04B 7/0413* (2013.01); *H04B 7/185* (2013.01); *H04L 12/66* (2013.01)

(58) Field of Classification Search
CPC ........ H04B 7/0413; H04B 7/185; H04L 12/66

USPC ......................................................... 375/267
See application file for complete search history.

(56) References Cited

U.S. PATENT DOCUMENTS

2002/0177465 A1   11/2002   Robinett

FOREIGN PATENT DOCUMENTS

| CN | 101179327 A | 5/2008 |
|----|-------------|--------|
| CN | 101689914 A | 3/2010 |
| CN | 103997365 A | 8/2014 |
| CN | 104731070 A | 6/2015 |
| CN | 104734770 A | 6/2015 |

(Continued)

*Primary Examiner* — Michael R Neff
(74) *Attorney, Agent, or Firm* — Andrus Intellectual Property Law, LLP

(57) ABSTRACT

The disclosure discloses a MIMO satellite service terminal. By periodically reporting terminal status information to a gateway platform and obtaining satellite communication systems that can be connected by all the MIMO satellite service terminal from broadcast message through a scheduling module, all the MIMO satellite service terminals in the network can update in real time the type of the satellite communication system to which other terminals in the network connect, whereby the same satellite communication system can be selected for communication or the communication across satellite communication systems can be carried out based on the forwarding by the gateway platform. The disclosure can improve the flexibility of satellite communication and make the users of different satellite communication systems realize interconnection and intercommunication, improve the application convenience for the user in the network and improve the bandwidth utilization rate of the communication system as well.

10 Claims, 4 Drawing Sheets

(56) References Cited

FOREIGN PATENT DOCUMENTS

| CN | 105490732 A | 4/2016 |
|----|-------------|--------|
| WO | 02091631 A1 | 11/2002 |

MULTI-INPUT AND MULTI-OUTPUT SATELLITE SERVICE TERMINAL

CROSS-REFERENCE TO RELATED PATENT APPLICATIONS

The present application is a continuation of International Application No. PCT/CN2015/097719, filed Dec. 17, 2015, which claims the benefit of priority to Chinese Application No. CN 201510920831.5, filed on Dec. 11, 2015, the content of which is incorporated herein by reference in its entirety.

FIELD OF THE INVENTION

The present disclosure relates to the technology of satellite communication and navigation, and in particular to a Multi-Input and Multi-Output (MIMO) satellite service terminal.

BACKGROUND

Among the present technology, there are a variety of satellite communication systems such as Inmarsat Maritime Satellite Telephone Communication System, Thuraya Satellite Telephone System and Beidou RDSS System. The existing satellite communication terminals generally can only work in one satellite communication system and fail to achieve communication across systems.

Thus, there is a need for a terminal device compatible with a variety of satellite communication systems and satellite navigation systems to implement satellite communications and navigation based on MIMO.

SUMMARY OF THE INVENTION

In view of the above, the present disclosure provides a MIMO satellite service terminal to be compatible with a plurality of different satellite communication systems simultaneously, thereby improving the flexibility of satellite communication.

The MIMO satellite service terminal includes:

an antenna adapted to receive and transmit a satellite signal in a frequency range of a plurality of different satellite communication systems;

a radio frequency module connected to the antenna;

a receive signal processing module connected to the radio frequency module for RF sampling the received satellite signal to obtain a radio frequency digital signal and for demodulating, dispreading and decoding the radio frequency digital signal to obtain broadcast message or destination address in all the satellite signals as a receive message of the terminal;

a scheduling module for acquiring a set of connectable systems of all the MIMO satellite service terminals from the broadcast message when the receive signal processing module receives the broadcast message, determining a set of connectable systems of the terminal based on the detected satellite communication link status and selecting the satellite communication system with the best link status as the satellite communication system selected by the terminal, wherein the set of connectable systems is the set of the satellite communication systems whose link status satisfy transmission and receive requirements;

an interface module for connecting with a general-purpose data processing terminal in a wireless way to transmit the receive message to the general-purpose data processing terminal; and a transmission signal processing module connected to the radio frequency module for periodically generating a satellite signal adapted to be transmitted by the satellite communication system selected by the terminal with terminal status information as message content and gateway platform address as destination address and transmitting the generated satellite signal to the radio frequency module, wherein the terminal status information includes the set of connectable systems.

Preferably, the interface module is further configured to acquire a transmission message and a transmission address from the general-purpose data processing terminal; and the scheduling module is further configured to acquire a set of connectable systems of a corresponding destination terminal according to the transmission address and, when the set of connectable systems of the terminal and the set of connectable systems of the destination terminal have an intersection, control the transmission signal processing module to generate a satellite signal adapted to be transmitted by the satellite communication system with the best link status in the intersection according to the transmission address and the transmission message and transmit the generated satellite signal to the radio frequency module.

Preferably, the scheduling module is further configured to control the transmission signal processing module to generate a forwarding satellite signal adapted to be transmitted by the satellite communication system selected by the terminal and transmit the generated forwarding satellite signal to the radio frequency module when the set of connectable systems of the terminal and the set of connectable systems of the destination terminal have no intersection, wherein the destination address of the forwarding satellite signal is the gateway platform address and the message content of the forwarding satellite signal includes the transmission address and the transmission message.

Preferably, the receive signal processing module is further configured to acquire a navigation message based on the satellite signal to determine the location information of the terminal; and the scheduling module is further configured to control the transmission signal processing module to generate a satellite signal adapted to be transmitted by the satellite communication system selected by the terminal with the location information as the broadcast message content and the gateway platform address as the destination address and transmit the generated satellite signal to the radio frequency module.

Preferably, the interface module is further configured to acquire a navigation control instruction from the general-purpose data processing terminal; and the scheduling module is configured to transmit the location information to the general-purpose data processing terminal through the interface module according to the navigation control instruction.

Preferably, the scheduling module is further configured to transmit map information to which the location information corresponds to the general-purpose data processing terminal through the interface module according to the navigation control instruction.

Preferably, the satellite communication terminal comprises a housing and a clamp provided on the housing adapted to secure the general-purpose data processing terminal.

Preferably, the interface module is connected to the general-purpose data processing terminal via a Bluetooth or a wireless LAN interface.

Preferably, the receive signal processing module and the transmission signal processing module are both software radio processing modules.

Preferably, the general-purpose data processing terminal is an intelligent mobile terminal or a tablet computer.

By periodically reporting the terminal status information to the gateway platform and obtaining the satellite communication systems that can be connected by all the MIMO satellite service terminal from the broadcast message through the scheduling module, all the MIMO satellite service terminals in the network can update in real time the type of the satellite communication system to which other terminals in the network connect, whereby the same satellite communication system can be selected for communication or the communication across satellite communication systems can be carried out based on the forwarding by the gateway platform. The embodiments of the disclosure can improve the flexibility of satellite communication and make the users of different satellite communication systems realize interconnection and intercommunication, improve the application convenience for the user in the network and improve the bandwidth utilization rate of the communication system as well.

BRIEF DESCRIPTION OF THE DRAWINGS

Through the following description of embodiments of the present disclosure with reference to the accompanying drawings, the foregoing and other objectives, features, and advantages of the present disclosure will be more apparent. In the drawings.

PREFERRED EMBODIMENTS OF THE PRESENT INVENTION

The present disclosure will be described below with reference to the following embodiments, but the present disclosure is not limited to these embodiments. Some specific details are described in detail in the following detailed description of the present disclosure. The present disclosure can be understood by those skilled in the art without those descriptions of the details. In order to avoid obscuring the essence of the disclosure, well-known methods, processes, procedures, components and circuits are not described in detail.

In addition, it will be understood by those skilled in the art that the drawings provided herein are for illustrative purpose and are not necessarily drawn to scale.

Unless the context clearly requires otherwise, the words "include", "including" and the like in the entire specification and claims should be construed as the meaning of inclusion rather than the meaning of exclusion or exhaustion, that is, the meaning of "including but not limited to".

In the description of the present disclosure, it needs to be understood that the terms "first", "second" and the like are for illustrative purposes only and should not to be construed as indicating or implying relative importance. In addition, in the description of the present disclosure, the meaning of "a plurality of" means two or more, unless otherwise specified.

Figure 1:
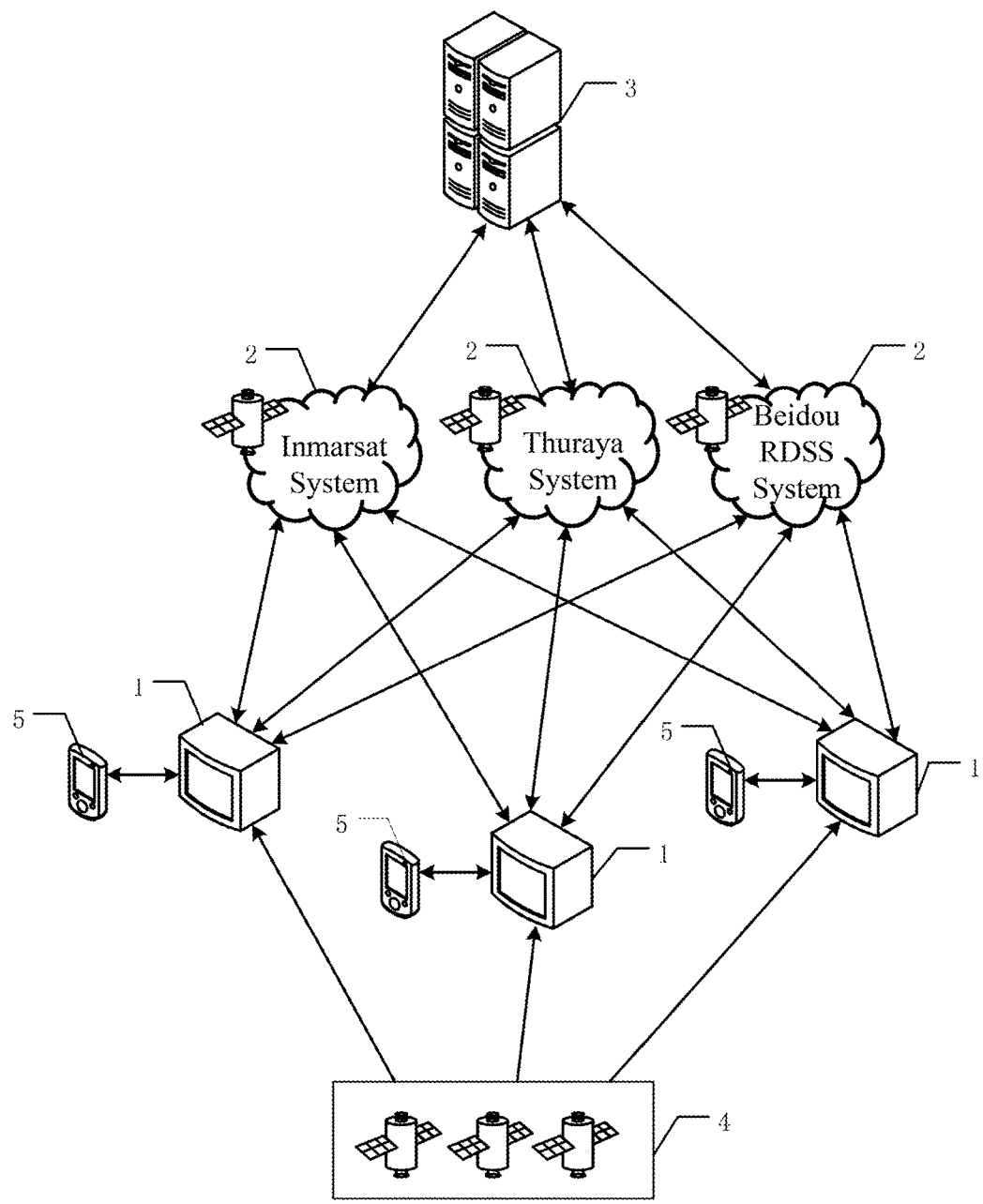
FIG. 1 is a schematic diagram of a MIMO satellite service system according to an embodiment of the present disclosure.

FIG. 1 is a schematic diagram of a MIMO satellite service system according to an embodiment of the present disclosure. As shown in FIG. 1, the MIMO (Multi-Input and Multi-Output) satellite service system (or multi-mode satellite service system) includes a plurality of MIMO satellite service terminals 1 (or multi-mode satellite service terminals), a plurality of different satellite communication systems 2 (e.g., Inmarsat maritime satellite telephone communication system, Thuraya satellite telephone system and Beidou RDSS system), a gateway platform 3 that can be connected to the plurality of different satellite communication systems 2 and a plurality of different satellite navigation systems 4 and a general-purpose data processing terminals 5 that can be connected to the MIMO satellite service terminal 1.

The MIMO satellite service terminals 1 can communicate with each other directly through the satellite communication systems 2, and at the same time, can realize communication across satellite communication systems based on forwarding of the message by the gateway platform 3.

Figure 2:
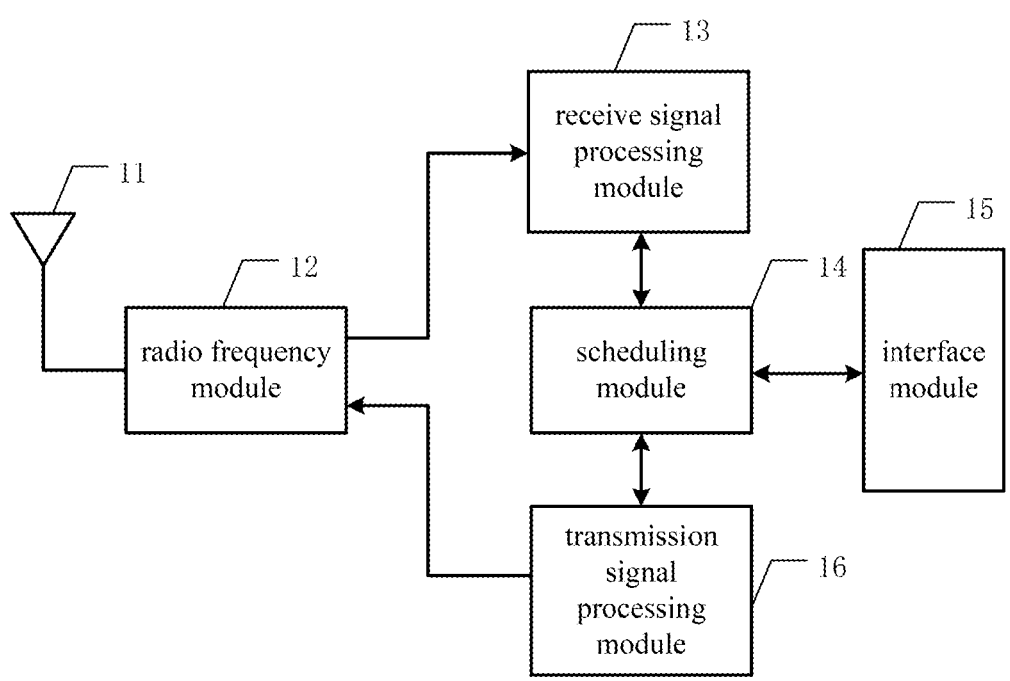
FIG. 2 is a schematic diagram of a MIMO satellite service terminal according to an embodiment of the present disclosure.

FIG. 2 is a schematic diagram of a MIMO satellite service terminal according to an embodiment of the present disclosure. As shown in FIG. 2, the MIMO satellite service terminal 1 includes an antenna 11, a radio frequency module 12, a receive signal processing module 13, a scheduling module 14, an interface module 15 and a transmission signal processing module 16. It will be readily understood that the MIMO satellite service terminal 1 can also include necessary peripheral circuits as well as power supply circuit for providing support to the work of the terminal.

In the MIMO satellite service terminal 1, the antenna 11 is adapted to receive and transmit satellite signal in the frequency range of a plurality of different satellite communication systems. It should be understood that the antenna 11 may be an array antenna or an antenna group composed of a plurality of antennas.

The radio frequency module 12 is connected to the antenna 11 for processing the satellite signals, including performing necessary low noise amplification and denoising processing to the received satellite signals so as to be adapted to be further processed by the receive signal processing module 13. At the same time, the radio frequency module 12 is further configured to perform necessary processing such as amplification to the satellite signal output from the transmission signal processing module 16 so as to output it to the antenna 11 for transmission.

The receive signal processing module 13 is connected to the radio frequency module 12 for RF sampling the received satellite signal to obtain a radio frequency digital signal, and for demodulating, dispreading and decoding the radio frequency digital signal to obtain broadcast message or destination address in all satellite signals as receive message of the terminal.

In this embodiment, the receive signal processing module 13 is a software radio processing module that supports processing of radio frequency signals in a programmable manner. As a result, satellite signals need to be RF converted to digital signals. By a high-speed AD converter built in the receive signal processing module 13, it is achieved that the RF signal is directly sampled to obtain the RF digital signal. Subsequent processing of the signals can be performed digitally, for example, demodulating, dispreading and decoding. A parameter configurable carrier NCO (numerically controlled oscillator), a parameter configurable spreading code NCO and a parameter configurable spreading code generator can be implemented through the software radio processing module, whereby the receiving of satellite signals of a plurality of different satellite communication systems can be carried out simultaneous on one integrated circuit.

It should be illustrated that, in this embodiment, the receive signal processing module 13 cooperates with the antenna 11 and the RF module 12 to receive satellite signals of a plurality of satellite communication systems simultaneously in multiple frequency bands.

The scheduling module 14 is configured to acquire a set of connectable systems of all the MIMO satellite service terminals from the broadcast message when the receive signal processing module 13 receives the broadcast message, determine a set of connectable systems of the terminal based on the detected satellite communication link status and select the satellite communication system with the best link status as the satellite communication system selected by the terminal, wherein the set of connectable systems is the set of the satellite communication systems whose link status satisfy transmission and reception requirements, that is, the set of connectable systems is a set of satellite communication systems that can perform communication obtained either based on currently received satellite signals or by detecting the uplinks and downlinks. The MIMO satellite service terminal 1 can perform signal transmission through any one type of satellite communication system in the set. Wherein, the broadcast message is transmitted by the gateway platform 3 through all the satellite communication systems in a broadcast way and the broadcast message includes terminal status information of all the MIMO satellite service terminals in the MIMO satellite service system. The terminal status information includes the set of connectable systems to which the terminal can connect.

The interface module 15 is configured to connect with the general-purpose data processing terminal 5 in a wireless way and transmit the receive message to the general-purpose data processing terminal.

In this embodiment, the MIMO satellite service terminal 1 is not provided with an input/output device and is connected to the general-purpose data processing terminal 5 through the interface module 15, and the MIMO satellite service terminal 1 performs the function of input/output via the general-purpose data processing terminal 5. Preferably, the general-purpose data processing terminal 5 can be a terminal device integrated with a short-range communication interface, such as a tablet computer or an intelligent mobile terminal. The interface module 15 can wirelessly connect with the data processing terminal 5 based on a Bluetooth or wireless LAN interface to interact with data and instructions.

When the receive signal processing module 13 receives the receive message whose destination address is the address of the terminal, it will transmit the receive message to the interface module 15 and then to the general-purpose data processing terminal 5 for displaying or playing. Therefore, it is possible to use portable terminal device as an input/output device without configuring a dedicated input/output component on the MIMO satellite service terminal 1, which reduces the number of the components and the size of the device, and reduces the cost at the same time.

Preferably, a clamp can be provided on the housing of the MIMO satellite service terminal 1 that is adapted to fix the general-purpose data processing terminal 5. Whereby the general-purpose data processing terminal 5 and the MIMO satellite service terminal 1 can be conveniently fixed together so as to be easy to carry and use.

The transmission signal processing module 16 is connected to the radio frequency module and is configured to periodically generate a satellite signal adapted to be transmitted by the satellite communication system selected by the terminal with terminal status information as message content and gateway platform address as destination address and transmit the generated satellite signal to the RF module.

That is, the transmission signal processing module 16 periodically reports terminal status information to the gateway platform 3 through the satellite communication system with the best link status. Whereby, the gateway platform 3 can learn the terminal status information of all the MIMO satellite service terminals 1. That is to say, the gateway platform 3 can acquire a set of satellite communication systems to which all the MIMO satellite service terminals 1 can currently connect and the satellite communication system with the best communication status. As mentioned above, the gateway platform 3 splices these information into broadcast message for broadcasting through all satellite communication systems.

Preferably, the transmission signal processing module 16 can also be a software radio processing module that generates a radio frequency signal by a high-speed DA conversion circuit and transmits the generated radio frequency signal to the radio frequency module 12 for transmitting.

Figure 3:
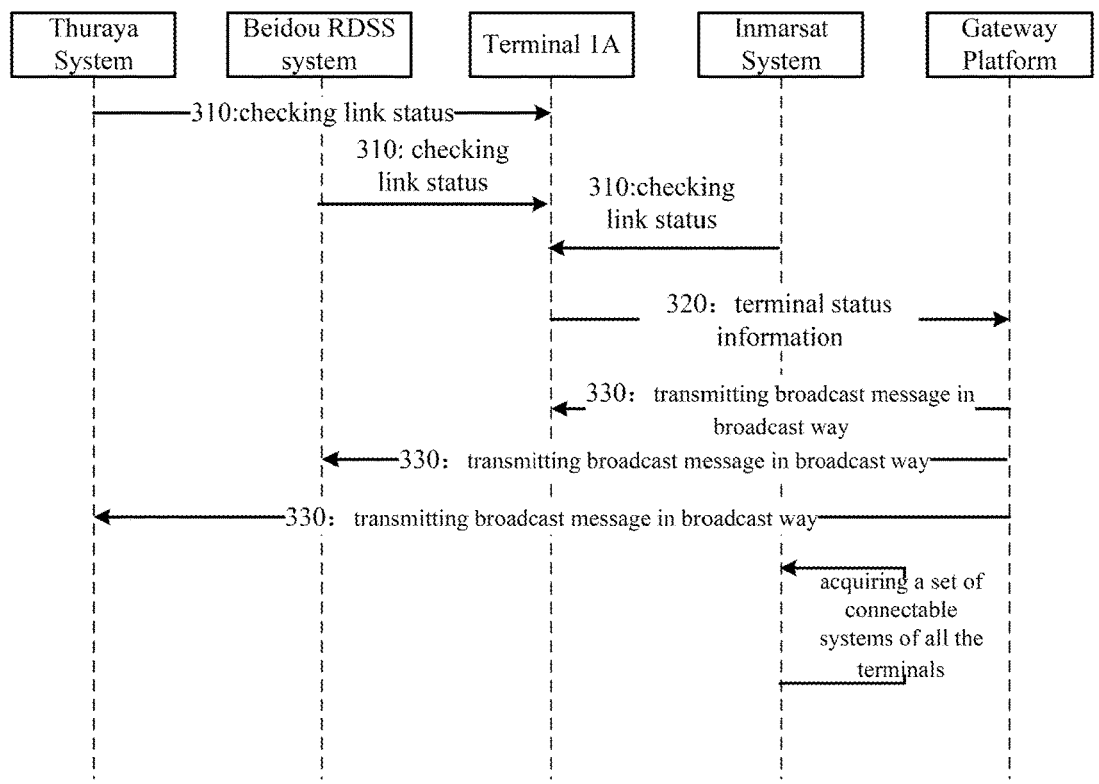
FIG. 3 is a flow chart showing terminal status reporting and broadcast message receiving performed by a MIMO satellite service terminal according to an embodiment of the present disclosure.

FIG. 3 is a flow chart showing terminal status reporting and broadcast message receiving performed by a MIMO satellite service terminal according to an embodiment of the present disclosure. As shown in FIG. 3, at step 310, the MIMO satellite service terminal 1 checks the link status of a plurality of different satellite communication systems to acquire status information.

At step 320, the MIMO satellite service terminal 1 transmits terminal status information to the gateway platform 3 through the satellite communication system 2 (Inmarsat system in FIG. 3) selected by the terminal.

For example, the satellite communication system selected by the terminal (the terminal 1A) is an Inmarsat system and the satellite communication system selected by the terminal 1B (not shown in the figure) is a Beidou RDSS system. Whereby, the terminal 1A and the terminal 1B respectively report terminal status information through different satellite communication systems.

At step 330, the gateway platform 3 packages all received terminal status information into a broadcast message and broadcasts the broadcast message through all the satellite communication systems.

At step 340, the MIMO satellite service terminal 1 can receive the broadcast message through each satellite communication system connected therewith (in FIG. 3, the MIMO satellite service terminal 1 receives the broadcast message through the Inmarsat system) and parses the received broadcast message to acquire a set of connectable system of all the MIMO satellite service terminals for storing.

Thus, based on above-described reporting-broadcasting mechanism for the terminal status information, each MIMO satellite service terminal may learn link status of other MIMO satellite service terminals, whereby an appropriate mode can be selected from a plurality of satellite communication systems for satellite communication.

Furthermore, at the transmitter of the communication, the interface circuit 12 of the MIMO satellite service terminal 1 acquires transmission message and transmission address from the general-purpose data processing terminal 5. That is, the user inputs the transmission message and the transmission address to the MIMO satellite service terminal 1 through the general-purpose data processing terminal 5. The transmission message may be either a short message or a call connection request. The transmission address is a communication identification of a destination terminal which is used to uniquely identify the destination terminal.

In this case, the scheduling module 13 is configured to acquire a set of connectable systems of a corresponding destination terminal according to the transmission address, and, when the set of connectable systems of the terminal and the set of connectable systems of the destination terminal have an intersection, control the transmission signal processing module 16 to generate a satellite signal adapted to be transmitted by the satellite communication system with the best link status in the intersection according to the transmission address and the transmission message and transmit the generated satellite signal to the radio frequency module.

At the receiving end of the communication, as the MIMO satellite service terminal 1 can simultaneously receive satellite signals of a plurality of satellite communication systems 2, thus, it can receive the transmission message, receive the short message or establish a voice connection through the satellite communication system with the best link status in the intersection.

Figure 4A:
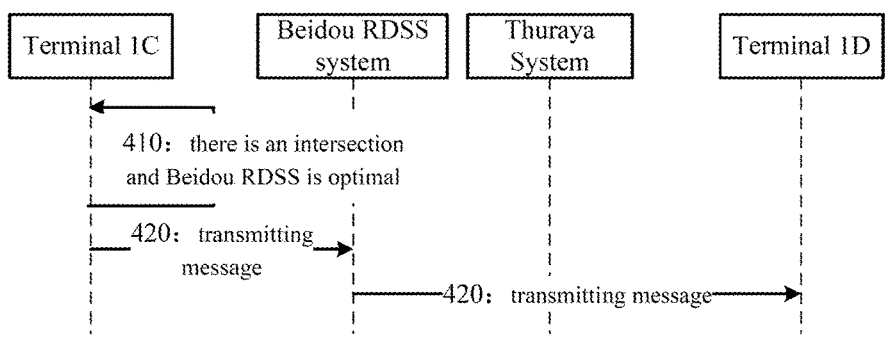
FIG. 4a is a flow chart showing a satellite communication performed by a MIMO satellite service terminal according to an embodiment of the present disclosure.

FIG. 4*a* is a flowchart showing a satellite communication performed by a MIMO satellite service terminal according to an embodiment of the present disclosure. As shown in FIG. 4*a*, at step 410, the terminal 1C can find that the terminal 1C and the terminal 1D can both connect to a Thuraya satellite telephone system and a Beidou RDSS system according to the known terminal status information, where the Beidou RDSS system has a better link status. Therefore, at step 420, the terminal 1C directly initiates a communication with the terminal 1D through the Beido RDSS system.

When the set of connectable systems of the terminal and the set of connectable systems of the destination terminal have no intersection, the MIMO satellite service terminal 1 in this embodiment performs communication across the satellite communication systems through the forwarding by the gateway platform 3.

At this time, at the transmitting end of the communication, the scheduling module 13 is further configured to control the transmission signal processing module 16 to generate a forwarding satellite signal adapted to be transmitted by the satellite communication system selected by the terminal and transmit the generated forwarding satellite signal to the radio frequency module when the set of connectable systems of the terminal and the set of connectable systems of the destination terminal have no intersection, wherein the destination address of the forwarding satellite signal is gateway platform address and the message content of the forwarding satellite signal includes the transmission address and the transmission message.

Figure 4B:
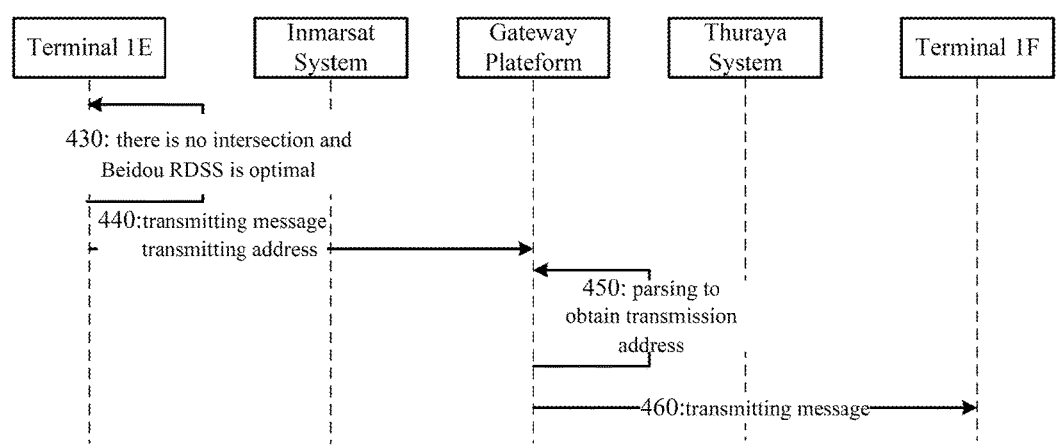
FIG. 4b is a flow chart showing a satellite communication performed by a MIMO satellite service terminal according to an embodiment of the present disclosure.

FIG. 4*b* is a flowchart showing a satellite communication performed by a MIMO satellite service terminal according to an embodiment of the present disclosure. As shown in FIG. 4*b*, at step 430, the terminal 1E, after receiving an instruction to communicate with the terminal 1F, can find out that there is no satellite communication system connectable between the terminal 1E and the terminal 1F according to the known terminal status information. In this case, at step 440, the terminal 1E transmits a satellite signal to the gateway platform 3 through the Inmarsat system with the best current link quality and the satellite signal includes the message to be transmitted to the terminal 1F and the address of the terminal 1F (i.e., the transmission address). At step 450, the gateway platform 3, after receiving the satellite signal, parses the satellite signal to obtain the address of the terminal 1F (i.e., the transmission address). As the gateway platform 3 stores terminal status information of all the terminals, thus, at step 460, the gateway platform 3 transforms the transmission message into Thuraya system based satellite signal that can be received by the terminal 1F and transmits the same to the terminal 1F.

On the receiving side, since the terminal 1F receives signals in the frequencies of all the satellite communication system that can be connected all the time, the transmission message forwarded by the gateway platform 3 can be promptly received.

Therefore, communication across satellite communication systems can be carried out.

By periodically reporting the terminal status information to the gateway platform and obtaining the satellite communication systems that are supported by all the MIMO satellite service terminal from the broadcast message through the scheduling module, all the MIMO satellite service terminals in the network can update in real time the type of the satellite communication system to which other terminals in the network connect, whereby the same satellite communication system can be selected for communication or the communication across satellite communication systems can be carried out based on the forwarding by the gateway platform. The embodiment can improve the flexibility of satellite communication and make the users of different satellite communication systems realize interconnection and intercommunication, improve the application convenience for the user in the network and improve the bandwidth utilization rate of the communication system as well.

In the meantime, the MIMO satellite service terminal in the embodiment can further realize the function of multimode positioning and navigation by using positioning signals received from a plurality of different satellite navigation systems.

Specifically, in the MIMO satellite service terminal 1, the receive signal processing module 13 is further configured to acquire a navigation message according to the satellite signal to determine location information of the terminal.

At the same time, the scheduling module 14 is further configured to control the transmission signal processing module 16 to generate a satellite signal adapted to be transmitted by the satellite communication system selected by the terminal with the location information as message content and gateway platform address as destination address and transmits the generated satellite signal to the RF module 12.

Therefore, the MIMO satellite service terminal can continuously report the location information to the gateway platform 3. The gateway platform 3 can acquire location information of all the MIMO satellite service terminals and provide location-based service based on the location information.

At the same time, the MIMO satellite service terminal 1 can also provide navigation service to the users through the general-purpose data processing device 5 connected thereto. Specifically, the interface module 15 is configured to acquire a navigation control instruction from the general-purpose data processing terminal 5.

The scheduling module 14 is configured to transmit the location information to the general-purpose data processing terminal 5 through the interface module 15 according to the navigation control instruction. The general-purpose data processing terminal 5 can display the current location information as well as other information based on the location or the movement state (movement direction, speed, acceleration, etc.).

At the same time, when the general-purpose data processing terminal 5 does not store map information, the scheduling module 14 is further configured to transmit the map information to which the location information correspond to the general-purpose data processing terminal 5 through the interface module 15 according to the navigation control instruction. The data processing terminal 5 displays the map as well as the current location, thereby providing the navigation service. Therefore, it is not necessary to previously store the map information in the general-purpose data processing terminal. The map information can be stored in advance in the MIMO satellite service terminal 1, or can be downloaded in real time via the satellite communication system by the MIMO satellite service terminal 1 based on the current location information.

As a result, it is possible to provide multi-mode satellite navigation and positioning services, which can ensure the reliability and real-time of the location information since the positioning can be performed by using a plurality of different satellite positioning systems and the location information can be reported through the plurality of different satellite communication systems.

The foregoing descriptions are merely preferred embodiments of the present disclosure, and are not intended to limit the present disclosure. For those skilled in the art, the present disclosure may have various modifications and variations. Any modification, equivalent replacement, improvement and the like made within the spirit and principle of the present disclosure should be included in the protection scope of the present disclosure.

What is claimed is:

1. A Multi-Input and Multi-Output (MIMO) satellite service terminal including:
   an antenna adapted to receive and transmit a satellite signal in a frequency range of a plurality of different satellite communication systems;
   an interface circuit connected to the antenna;
   a receive signal processing module of an integrated circuit connected to the interface circuit to RF (radio frequency) sample the received satellite signal to obtain a radio frequency digital signal from the received satellite signal, and the receive signal processing module of the integrated circuit demodulates, dispreads, and decodes the radio frequency digital signal to obtain a broadcast message or a destination address in all the satellite signals as a receive message of the terminal;
   a scheduling software module of the integrated circuit that acquires a set of connectable systems of all the MIMO satellite service terminals from the broadcast message, determines, a set of connectable systems of the terminal based on the detected satellite communication link status and selects the satellite communication system with the best link status as the satellite communication system selected by the terminal, wherein the set of connectable systems is the set of the satellite communication systems whose link status satisfy transmission and receive requirements;
   a wireless communication connection that wirelessly transmits the receive message to the general-purpose data processing terminal; and
   a transmission signal processing module of the integrated circuit periodically generates a satellite signal adapted to be transmitted by the satellite communication system selected by the terminal with terminal status information as message content and a gateway platform address as the destination address and transmits the generated satellite signal to the interface circuit, wherein the terminal status information includes the set of connectable systems.

2. The MIMO satellite service terminal according to claim 1, wherein the wireless communication connection is further configured to acquire a transmission message and a transmission address from the general-purpose data processing terminal; and
   the integrated circuit executing the scheduling software module is further configured to acquire a set of connectable systems of a corresponding destination terminal according to the transmission address and, when the set of connectable systems of the terminal and the set of connectable systems of the destination terminal have an intersection, control the execution of the transmission signal processing software module to generate a satellite signal adapted to be transmitted by the satellite communication system with the best link status in the intersection according to the transmission address and the transmission message and transmit the generated satellite signal to the interface circuit.

3. The MIMO satellite service terminal according to claim 2, wherein the integrated circuit executing the scheduling software module is further configured to control the execution of the transmission signal processing software module to generate a forwarding satellite signal adapted to be transmitted by the satellite communication system selected by the terminal and transmit the generated forwarding satellite signal to the radio frequency module when the set of connectable systems of the terminal and the set of connectable systems of the destination terminal have no intersection, wherein the destination address of the forwarding satellite signal is the gateway platform address and the message content of the forwarding satellite signal includes the transmission address and the transmission message.

4. The MIMO satellite service terminal according to claim 1, wherein the integrated circuit executing the receive signal processing software module is further configured to acquire a navigation message according to the satellite signal to determine the location information of the terminal; and
   the integrated circuit executing the scheduling software module is further configured to control the transmission signal processing module to generate a satellite signal adapted to be transmitted by the satellite communication system selected by the terminal with the location information as the broadcast message content and the gateway platform address as the destination address and transmit the generated satellite signal to the radio frequency module.

5. The MIMO satellite service terminal according to claim 4, wherein the wireless communication connection is further configured to acquire a navigation control instruction from the general-purpose data processing terminal; and
   the integrated circuit executing the scheduling software module is configured to transmit the location information to the general-purpose data processing terminal through the wireless communication connection according to the navigation control instruction.

6. The MIMO satellite service terminal according to claim 5, wherein the integrated circuit executing the scheduling software module is further configured to transmit map information to which the location information correspond to the general-purpose data processing terminal through the wireless communication connection according to the navigation control instruction.

7. The MIMO satellite service terminal according to claim 1, wherein the satellite communication terminal comprises a housing and a clamp provided on the housing adapted to secure the general-purpose data processing terminal.

8. The MIMO satellite service terminal according to claim 1, wherein the wireless communication connection is connected to the general-purpose data processing terminal via a Bluetooth or a wireless LAN interface.

9. The MIMO satellite service terminal according to claim 1, wherein the receive signal processing software module and the transmission signal processing software module executed by the integrated circuit are both software radio processing modules.

10. The MIMO satellite service terminal according to claim 1, wherein the general data processing terminal is an intelligent mobile terminal or a tablet computer.

* * * * *